(12) United States Patent
Navrotsky et al.

(10) Patent No.: US 6,960,327 B2
(45) Date of Patent: Nov. 1, 2005

(54) METHODS FOR REMOVING ORGANIC COMPOUNDS FROM NANO-COMPOSITE MATERIALS

(75) Inventors: Alexandra Navrotsky, Davis, CA (US); Atul Navinchandra Parikh, Davis, CA (US)

(73) Assignee: The Regents of the University of California, Oakland, CA (US)

(*) Notice: Subject to any disclaimer, the term of this patent is extended or adjusted under 35 U.S.C. 154(b) by 177 days.

(21) Appl. No.: 10/356,325

(22) Filed: Jan. 30, 2003

(65) Prior Publication Data

US 2004/0151651 A1 Aug. 5, 2004

(51) Int. Cl.[7] .............................. B01J 37/34; C01F 3/00; C22B 58/00
(52) U.S. Cl. .................. 423/130; 423/335; 427/553; 427/246; 502/5
(58) Field of Search ............................... 423/111, 130, 423/133, 155, 188, 195, 324, 325; 502/5, 100, 150, 400, 439, 506, 422, 522; 427/553, 243, 245, 246, 554, 555, 556

(56) References Cited

U.S. PATENT DOCUMENTS

| | | | |
|---|---|---|---|
| 5,431,967 A | * 7/1995 | Manthiram et al. | 427/555 |
| 5,622,684 A | * 4/1997 | Pinnavaia et al. | 423/702 |
| 5,770,275 A | * 6/1998 | Raman et al. | 427/535 |
| 5,853,866 A | * 12/1998 | Watanabe et al. | 428/312.8 |
| 5,858,457 A | * 1/1999 | Brinker et al. | 427/162 |
| 5,958,577 A | * 9/1999 | Sugimoto et al. | 428/333 |
| 6,232,264 B1 | * 5/2001 | Lukehart et al. | 502/339 |
| 6,310,110 B1 | * 10/2001 | Markowitz et al. | 521/99 |
| 6,391,808 B1 | * 5/2002 | Stiegman | 501/12 |
| 6,565,763 B1 | * 5/2003 | Asakawa et al. | 216/56 |
| 6,645,571 B1 | * 11/2003 | Takai et al. | 427/553 |
| 6,699,797 B1 | * 3/2004 | Morris et al. | 438/778 |
| 6,733,946 B2 | * 5/2004 | Kumacheva et al. | 430/138 |
| 2001/0000323 A1 | 4/2001 | Lee et al. | |
| 2001/0022961 A1 | 9/2001 | Lee et al. | |
| 2001/0027935 A1 | 10/2001 | Lee et al. | |
| 2003/0019792 A1 | 1/2003 | Chen et al. | |
| 2003/0039610 A1 | 2/2003 | Davis et al. | |
| 2003/0069449 A1 | 4/2003 | Zones et al. | |
| 2003/0133870 A1 | 7/2003 | Chen et al. | |
| 2003/0205133 A1 | 11/2003 | Lee et al. | |
| 2003/0205502 A1 | 11/2003 | Lee et al. | |
| 2003/0206844 A1 | 11/2003 | Lee et al. | |
| 2003/0232007 A1 | 12/2003 | Elomari et al. | |
| 2004/0004026 A1 | 1/2004 | Zones | |
| 2004/0005264 A1 | 1/2004 | Zones | |
| 2004/0005271 A1 | 1/2004 | Zones et al. | |

FOREIGN PATENT DOCUMENTS

EP   1083159 A2 * 3/2004

OTHER PUBLICATIONS

Büchel et al., In Situ Surfactant Removal From MCM–Type Mesostructures By Ozone Treatment, *J. Mater. Chem.*, 11: 589–593 (2001).

Clark et al., A New Application of UV–Ozone Treatment in the Preparation of Substrate–Supported, Mesoporous Thin Films, *Chem. Mater.* 12:3879–3884 (2000).

Mark E. Davis, Ordered Porous Materials for Emerging Applications, *Nature*, 417:813–821 (2002).

Keene et al., Ozone Treatment for the Removal of Surfactant to Form MCM–41 Type Materials, *Chem. Commun*, pp. 2203–2204 (1998).

* cited by examiner

*Primary Examiner*—Colleen P. Cooke
(74) *Attorney, Agent, or Firm*—Townsend and Townsend and Crew LLP

(57) ABSTRACT

The present invention provides methods for selectively removing organic compound from a nano-composite material which comprises the organic compound that is dispersed within a solid inorganic compound structure. In particular, methods of the present invention comprise irradiating the nano-composite material with electromagnetic radiation wavelength that is shorter than the wavelength of visible light.

35 Claims, 5 Drawing Sheets

METHODS FOR REMOVING ORGANIC COMPOUNDS FROM NANO-COMPOSITE MATERIALS

STATEMENT RELATING TO FEDERALLY SPONSORED RESEARCH

This invention was made with Government support under Grant No. DMR 01-01391 awarded by the National Science Foundation. The Government has certain rights in this invention.

BACKGROUND OF THE INVENTION

Many porous solids have the ability to interact with atoms, ions and molecules not only at their surfaces, but throughout the bulk of the material. In addition, porous solids can serve as hosts for guest species. These features of porous solids can be used in a wide variety of applications, including chemical processes and electronic applications. Some of the chemical process areas in which porous solids are useful include fluid separation, catalytic reactions, adsorption of ions or molecules, purification of compounds, and the like. The ability of porous solids to serve as hosts for guest species can be used to impart the material with optical, electrical or magnetic properties by selecting appropriate guest species, thereby making porous solids useful in a variety of optical and electronic applications.

Typically, porous solids are classified according to the average pore diameter. For example, microporous solids have an average pore diameter, i.e., pore size, of about 2 nm or less, mesoporous solids have an average pore size in the range of about 2 nm to about 50 nm, and macroporous solids have an average pore size of about 50 nm or greater. See "Ordered Porous Materials for Emerging Applications", Davis, *Nature*, 2002, 417, 813–821, and references cited therein, all of which are incorporated herein by reference in their entirety.

Synthetic porous solids are generally produced by adding an organic compound (i.e., template or structure directing agent or SDA) to an inorganic material precursor solution, precipitating the inorganic material from the solution to form a nano-composite material in which the organic compound is intimately and/or uniformly dispersed within a solid inorganic material structure, and removing the organic compound from the solid inorganic material structure, i.e., nano-composite material. The organic compound serves as a template for pores, and the pore size of the solid inorganic material depends on the size of the organic compound that is encapsulated or entrapped within the framework of inorganic material. When an organic surfactant is used as a template, the pore size of the solid inorganic material is relatively large because the framework of inorganic material is built around the micelles, i.e., colloidal particles, formed by the surfactant. Micelles are inherently larger in size than their constituents. Thus, using a surfactant as a template generally produces mesoporous solids.

As stated above, pores are produced in the inorganic material framework by removing the encapsulated organic compound from the nano-composite material. Often, thermal methods, i.e., calcination processes, are used to remove the organic compound from the nano-composite material. Calcination of the nano-composite material typically involves heating the nano-composite material under a flow of oxygen or air to about 500° C. or higher and maintaining the heating temperature for several hours. Thus, a large amount of energy is expended in the calcination process leading to a relatively high cost of producing such porous solids.

Additionally, some nano-composite materials are not thermally stable, and calcination processes can not be used to remove the organic compound. While other methods, such as solvent, plasma and supercritical fluid extraction, have also been used to remove the organic compound from the nano-composite material, each has its own disadvantages and limitations. For example, waste disposal of hazardous solvents can be quite expensive and the high reactivity of plasma may result in destruction of some of the inorganic materials.

Recently, ozone treatment to remove surfactants from silicate and aluminosilicate materials to produce MCM-type mesostructure has been reported. See Keene et al., *Chem. Commun.*, 1998, 2203–4, and Büchel, et al., *J. Mater. Chem.*, 2001, 11, 589–593. Materials that are produced in these ozone treated mesostructures reportedly have a larger pore size compared to calcined MCM-41 mesostructures. Moreover, the authors report that ozone treatment to produce "microporous materials such as zeolites, could be hampered by the steric hindrance of the micropores themselves." Keene et al., *Chem. Commun.*, 1998, at 2203.

SUMMARY OF THE INVENTION

One aspect of the present invention provides a method for producing a microporous inorganic material from a nano-composite material which comprises an organic compound that is dispersed within a solid inorganic compound structure. Typically, the organic compound is intimately and/or uniformly dispersed within the solid inorganic framework. Removal of the organic compound from the nano-composite material comprises exposing the nano-composite material to light or electromagnetic radiation that has a wavelength shorter than visible light under conditions sufficient to selectively remove the organic compound from the nano-composite material. The microporous inorganic material can be a crystalline material or an amorphous material. Preferably, however, the microporous inorganic material is a crystalline material.

The microporous inorganic material can be calcined after photolysis to further remove any trace of organic material that may be present in the inorganic material. However, it has been found by the present inventors that typically the calcination step is not necessary in methods of the present invention.

In some embodiments, the nano-composite material is exposed to light in the presence of oxygen gas. Oxygen gas can be in a substantially pure form (i.e., >90% purity) or a dilute form, e.g., in air or diluted with other inert gas such as helium or argon. Moreover, oxygen gas can be generated under the reaction conditions, for example, by decomposition of peroxides, such as hydrogen peroxide and peracids, or perhalogenates, such as perchlorate, periodate, and the like.

In some embodiments, the organic compound is removed from one or more selected regions of the nano-composite material. In this manner a patterned microporous inorganic material can be produced from the nano-composite material. It should be appreciated that when only selected regions of the nano-composite material are exposed to light, the resulting material contains both microporous inorganic portions, i.e., light-exposed regions, as well as nano-composite portions, i.e., non-exposed regions. Removal of the organic compound from selected regions of the nano-composite material can be achieved by using a directed beam of light, e.g., laser, or by placing a mask having a desired pattern over the nano-composite material prior to exposing the selected regions of the nano-composite material to light.

Another aspect of the present invention provides a method for producing a structured microporous inorganic material. The method generally comprises producing a nano-composite material from a mixture comprising an organic compound and an inorganic compound such that the organic compound is dispersed within a first structured solid inorganic compound structure; and removing the organic compound from the nano-composite material by exposing the nano-composite material to an electromagnetic radiation having a wavelength shorter than visible light under conditions sufficient to produce the structured microporous inorganic material. The structure of the inorganic framework can be substantially unchanged or changed significantly after photolysis depending on the reaction conditions.

Yet another aspect of the present invention provides a method for producing a microporous inorganic oxide material. In this aspect, the method generally includes:

preparing a reaction mixture capable of forming an inorganic oxide, wherein the reaction mixture also comprises an organic compound;

producing a nano-composite material from the reaction mixture, wherein the nano-composite material comprises the organic compound that is dispersed within a solid inorganic oxide structure; and selectively removing the organic compound by exposing the nano-composite material to electromagnetic radiation having a wavelength shorter than visible light to produce the microporous inorganic oxide material.

Practically any microporous inorganic oxide can be prepared using methods of the present invention provided that there is a suitable inorganic oxide precursor capable of forming a nano-composite material in the presence of an organic compound. Exemplary inorganic oxides that can be prepared include non-metallic oxides (e.g., silicon oxide) and metal oxides, including transition metal oxides and lanthanide metal oxides. In one particular embodiment, the inorganic oxide is selected from the group consisting of silicon oxide, a transition metal oxide, a lanthanide metal oxide, and combinations thereof. Of inorganic oxides, microporous silica materials and microporous aluminophosphate materials are particularly preferred.

In one embodiment, inorganic materials, e.g., inorganic oxides, of the present invention are crystalline in structure, which can be a result of kinetic or thermodynamic control. Formation of a particular crystal structure form of the inorganic material depends on a wide variety of reaction conditions for making the nano-composite material, such as the reaction temperature, reaction time, reaction solvent, reversibility of solid formation, and the like. In one particular embodiment, the crystal structure of microporous inorganic material is hexagonally-packed.

The organic compound (i.e., template or SDA) can be any compound as long as it can be selectively removed by methods of the present invention. Typically, the template is a small organic molecule (i.e., molecular weight of less than about 1000 g/mole), a synthetic polymer, a biological material, or other hydrocarbon compound which optionally comprises one or more halides and/or heteroatoms selected from the group O, N, S, Si, P.

Nano-composite materials of the present invention are conveniently produced in an aqueous solution by admixing inorganic material precursor(s) and the organic compound, precipitating out the organic-inorganic material, i.e., nano-composite material, and collecting the nano-composite material. While not necessary, often the nano-composite material is dried prior to photolysis by heating the collected nano-composite material at an elevated temperature. The drying temperature is carefully selected as to avoid calcining the nano-composite material during the drying process. Typically, the nano-composite material is dried at a temperature of less than about 200° C., preferably at a temperature in the range from about 25° C. to about 200° C.

Still another aspect of the present invention provides a method for producing a microporous inorganic material, said method comprising:

producing a nano-composite material which comprises an organic compound that is dispersed within a solid inorganic compound structure; and selectively removing the organic compound from the nano-composite material to produce the microporous inorganic material by irradiating the nano-composite material with light having a wavelength shorter than visible light under conditions sufficient to selectively remove the organic compound from the nano-composite material.

Yet another aspect of the present invention provides a method for producing a crystalline inorganic material. This aspect of the present invention generally comprises producing a crystalline nano-composite material which comprises an organic compound that is dispersed within a crystalline inorganic material. The organic compound is then selectively removed by exposing the crystalline nano-composite material to light having a wavelength smaller than the wavelength of visible light under conditions sufficient to produce the crystalline inorganic material.

As discussed above, using a surfactant as a template results in mesoporous materials. This is because the surfactant forms micelles in an aqueous solution and the inorganic framework is formed around micelles rather than individual organic molecules. In contrast, one aspect of the present invention provides a method for producing a microporous inorganic material that is derived from a nano-composite material in which a majority of individual organic component is separated from other organic components within a solid inorganic material framework.

DETAILED DESCRIPTION OF THE INVENTION

Definitions

Figure 1:
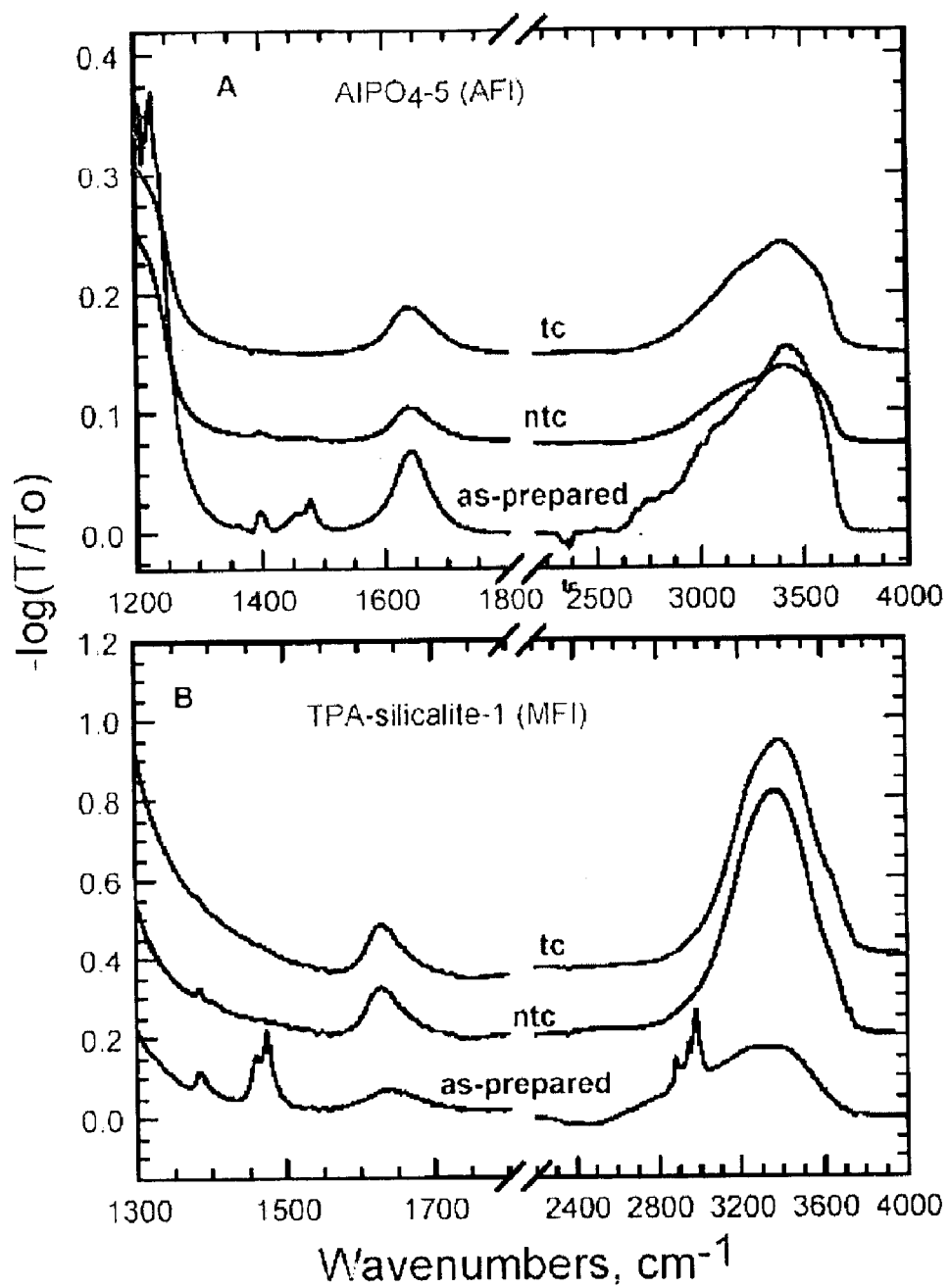
FIG. 1 is an infrared spectrum of pressed KBr pellets containing calculated quantities of as-prepared, calcined (tc), and photolyzed (NTC) (a) AlPO$_4$-5 and (b) TPA-Silicalite-1 of Examples 1 and 2.

"Deep Ultraviolet light" or "DUV" refers to electromagnetic radiation whose wavelength ranges from about 280 nm to about 100 nm.

The terms "halo" and "halide" are used interchangeably herein and refer to fluoro, bromo, chloro or iodo.

"Hydrocarbon" refers to any compound that comprises hydrogen and carbon. A hydrocarbon compound can be saturated, unsaturated (including aromatic), cyclic, non-cyclic or a combination of such structures.

"Layer" refers to a discontinuous structure.

Unless the context requires otherwise, the term "light" refer to electromagnetic radiation having a sufficient energy to selectively remove the organic compound from the nano-composite material under the reaction conditions.

"Microporous" refers to a porous material having pore diameters of about 2 nm or less, preferably about 1 nm or less, and more preferably in the range of from about 0.5 nm to about 1 nm.

"Nano-composite material" refers to a solid material comprising an organic compound and an inorganic compound in which the organic compound is dispersed within a solid inorganic compound structure. Preferably, the organic compound is intimately dispersed throughout the solid inorganic compound structure.

"Organic compound" refers to a hydrocarbon compound which can optionally be substituted with one or more heteroatoms selected from oxygen, sulfur, nitrogen, phosphorous, silicon, and halide. Thus, the term "organic compound" includes perhalogenated hydrocarbon compounds in which all the hydrogen atoms of the hydrocarbon compound is replaced with halides.

"Photolysis" refers to exposing the nano-composite material to light or electromagnetic radiation that has a wavelength shorter than visible light under conditions sufficient to selectively remove the organic compound from the nano-composite material.

"Photooxidative process" refers to irradiating a material with light in the presence of an oxidizing agent.

"Thin film" refers to a continuous structure.

"Visible light" refers to electromagnetic radiation whose wavelength ranges from about 780 nm to about 380 mm.

Overview

Microporous inorganic materials, such as silicates (including zeolites), aluminophosphate, and other inorganic materials, often consist of tetrahedral frameworks defining pores of nanometer dimensions. Synthetic zeolites are often produced using organic molecules or ions as structure-directing agents or templates. See, for example, Barrer, R. M., *Hydrothermal Chemistry of Zeolites*, Academic Press, London, 1982, which is incorporated herein by reference in its entirety. In contrast, mesoporous materials, which have a higher average pore size than microporous materials, are typically synthesized using surfactants as templates. See, for example, Kresge et al., *Nature*, 1992, 359, 710–712. Moreover, whereas the framework of microporous inorganic materials are generally in a crystalline form, the framework of mesoporous inorganic materials are often amorphous. However, it should be noted that in both microporous and mesoporous materials, the pores are generally arranged in a crystalline-like lattice structure.

Natural zeolite minerals are aluminosilicates and high silica zeolite-like materials used in the cracking of petroleum and MCM-type mesoporous materials are almost pure $SiO_2$. See, for example, Corma, *Chem. Rev.*, 1997, 97, 2373–2419. Recently, there has been a significant increase in ability to fabricate new porous solids with ordered structures from a wide range of different materials, for example, silicates and aluminophosphates containing elements such as Ga, P, Ge, Co, and Zn in their frameworks. See, for example, Cheetham et al., *Angew. Chem. Int. Ed.*, 1999, 38, 3268–3292, which is incorporated herein by reference in its entirety. Much of this interest stems from the ability to create new framework types, sometimes having larger rings and pores or unique geometries. However, for such materials to be useful, e.g., as catalysts, ion exchangers, sensors, or separation membranes, the co-crystallized, i.e., encapsulated, organic molecules within the inorganic material structure need to be selectively removed. This is often done by calcination at temperatures up to 500° C. or higher. Unfortunately, solid framework structures of some inorganic materials are quite fragile and often are destroyed during calcination resulting in an amorphous phase of a low surface area. In some cases, the organic compound can be removed by supercritical fluid extraction, see for example, Kawi, *Chem. Commu.*, 1998, 13, 1407–1408, or other extraction methods, such as solvent or plasma extraction. However, each of these methods also has its own disadvantages and limitations, such as a high cost for disposing a hazardous solvent, high reactivity of plasma which may result in at least a partial destruction of inorganic materials, and so forth.

The present invention provides methods for removing the organic molecules that are present within the solid framework structure of inorganic materials without the need for calcination or an extraction process. In particular, methods of the present invention comprise exposing a nano-composite material to light or electromagnetic radiation having a wavelength shorter than the wavelength of visible light to selectively remove an organic compound thereby leaving behind a structured inorganic material.

Nano-composite Material

A "nano-composite material" refers to a solid material comprising an organic compound and an inorganic compound in which molecules of the organic compound are dispersed within a solid inorganic compound structure or framework. Preferably, molecules of the organic compound are dispersed substantially uniformly throughout the solid inorganic compound structure. Moreover, the solid inorganic material of the nano-composite material is preferably in a crystalline form.

Nano-composite materials can be produced from a wide variety of organic compounds and inorganic compounds. Generally, using a surfactant as the organic compound portion leads to a mesoporous solid inorganic material, which has a relatively larger average pore size than a microporous material. See, for example, Keene et al., *Chem. Commun.*, 1998, 2203–4, and Büchel, et al., *J. Mater. Chem.*, 2001, 11, 589–593. Without being bound by any theory, it is believed that a formation of mesoporous structure when a surfactant is used as the template is due to the fact that the surfactant often forms micelles or colloidal particles in an aqueous solution. As the inorganic material solidifies or precipitates, it encapsulates, or entraps, micelles within its solid structure, i.e., framework. When the micelles are removed from this nano-composite material, the resulting porous material is mesoporous or macroporous material depending on the size of the micelles that were entrapped within the solid inorganic material framework. Since micelles or colloidal particles are inherently larger in size than its individual constituents, i.e., organic molecules, the average pore size of the resulting porous material is larger than the pore size of the porous material that is produced from a nano-composite material in which each individual organic molecule is separately encapsulated within the inorganic solid structure.

In contrast, organic compounds that are used to produce nano-composite materials of the present invention are generally non-surfactant organic compounds, i.e., organic molecules that do not form micelles or colloidal particles under the reaction conditions. However, it should be appreciated that surfactants can be used in methods of the present invention as long as the concentration of surfactant is maintained below the critical micelle concentration (CMC). For example, when a surfactant is used as a template, reaction conditions for formation of the nano-composite material are adjusted such that micelle formation from the surfactant is discouraged or prevented. Micelle formation from the surfactant can be prevented using a variety of techniques, such as vigorously stirring the reaction mixture and/or reducing the surfactant concentration in the reaction mixture, and the like. Typically, however, organic compounds that are used to produce nano-composite materials of the present invention are non-surfactant type small organic molecules or ions, organic polymers, as well as biological materials, such as proteins, carbohydrates.

The inorganic framework of nano-composite materials of the present invention can be comprised of any suitable inorganic material known to one skilled in the art. The inorganic framework in nano-composite materials of the present invention can be any solid structure including crystalline and amorphous structures. Preferably, however, the inorganic framework is a crystalline structure.

While the starting reagents or precursors and procedures may differ for each type of nano-composite material being produced, the syntheses of nano-composite materials are generally well known to one skilled in the art. See, for example, Davis, *Nature*, 2002, 417, 813–821, and references cited therein, all of which are incorporated herein by reference. For example, nano-composite materials comprising a silicate framework can be produced from a variety of silicate sources or precursors, including silicon oxide and organic silanes, such as tetraalkyl orthosilicates (e.g., tetraethyl orthosilicate, and tetramethyl orthosilicate), and other precursors known to one skilled in the art. See, for example, U.S. Pat. No. 6,465,387, which is incorporated herein by reference in its entirety.

Nano-composite materials can also comprise an aluminophosphate framework. Such nano-composite materials can be prepared from a variety of aluminophosphate sources or precursors, for example, from a mixture of orthophosphoric acid and aluminum oxide. See U.S. Pat. No. 4,310,440, which is incorporated herein by reference in its entirety. Other reagents that can be used to prepare aluminophosphate based nano-composite materials include a mixture of aluminum hydroxides and orthophosphoric acid or other phosphate sources known to one skilled in the art.

Other useful inorganic frameworks of nano-composite materials are well known to one skilled in the art and include, but are not limited to, germanosilicates, gallosilicate, and zinc-containing silicates. See, for example, See Davis, *Nature*, 2002, 417, 813–821, and references cited therein. Starting materials or reagents and procedures needed to prepare these inorganic framework based nano-composite materials are also well known to one skilled in the art. Id. See, also, Corma et al., *J. Chem. Soc. Chem. Commun.*, 1994, 1059.

In one particular embodiment, the inorganic framework in nano-composite materials is an inorganic oxide. Suitable precursors for producing the inorganic oxide framework include metal oxides and single or double metal alkoxide compounds. Exemplary metal alkoxides include aluminum (III) ethoxide, aluminum(III) isopropoxide, aluminum(III) n-, sec- or tert-butoxide, antimony(III) isopropoxide, antimony(III) n-butoxide, calcium(II) ethoxide, calcium(II) isopropoxide, calcium(II) tert-butoxide, chromium(IV) isopropoxide, chromium(IV) tert-butoxide, copper(II) methoxyethoxide, gallium(III) isopropoxide, germanium (IV) ethoxide, germanium(IV) isopropoxide, indium(III) isopropoxide, iron(III) ethoxide, iron(III) isopropoxide, iron (III) tert-butoxide, lead(II) isopropoxide, lead(II) tert-butoxide, magnesium(II) ethoxide, manganese (II) isopropoxide, molybdenum(V) isopropoxide, niobium(V) ethoxide, silicon(IV) methoxide, silicon(IV) ethoxide, silicon(IV) propoxide, silicon(IV) butoxide, silicon(IV) hexoxide, strontium(II) ethoxide, tin(IV) isopropoxide, titanium(IV) ethoxide, titanium(IV) propoxide, titanium(IV) isopropoxide, titanium(IV) butoxide, titanium(IV) octadecoxide, tungsten(VI) ethoxide, tungsten(VI) isopropoxide, vanadium(V) triisopropoxide oxide, zinc(II) isopropoxide, zinc(II) tert-butoxide, zirconium(IV) n-propoxide, zirconium(IV) isopropoxide, zirconium(IV) butoxide, zirconium(IV) tert-butoxide, aluminum (III) silicon (IV) alkoxide, titanium(IV) silicon(IV) polyethoxide and other alkoxides known to one skilled in the art.

In addition, other metals, such as titanium, vanadium, zirconium, gallium, germanium, cobalt, zinc, and other transition and lanthanide metals, can be incorporated into the inorganic framework (e.g., siliceous or aluminophosphate) of the nano-composite materials. See, for example, Cheetham et al., *Angew. Chem. Int. Ed.*, 1999, 38, 3268–3292; Corma et al., *J. Chem. Soc. Chem. Commun.*, 1994, 1059; and Tuel et al., *Chem. Commun.*, 1996, 651, all of which are incorporated herein by reference in their entirety.

Procedures for preparing nano-composite materials of the present invention are well known to one skilled in the art and can vary widely depending on the type of nano-composite material desired. Generally, the organic compound (or template) and inorganic material precursor(s) are combined in an aqueous solution and stirred under conditions sufficient to produce a precipitate which comprises the organic compound that is dispersed within the solid inorganic compound framework. In some cases, the initial aqueous solution is heated to facilitate dissolution of the inorganic material precursor, and after all the materials are dissolved, the aqueous solution is cooled to allow the precipitate to form.

The nano-composite material is then isolated and collected, e.g., via filtration. While not necessary, the isolated nano-composite material can be dried prior to selectively removing the organic compound from the nano-composite material. The nano-composite material can be formed as bulk or a thin film, for example, by spreading the nano-composite material on a substrate, depending on a particular application or need. Methods for producing thin films or bulk nano-composite materials are well known to one skilled in the art. See, for example, Kresge et al., *Nature*, 1992, 359, 710–710, Bagshaw et al., *Science*, 1995, 269, 1242–1244, Lu et al., *Nature*, 1997, 389, 364–368, Aksay et al., *Science*, 1996, 273, 892–898, and Yang et al., 1996, 379, 703–705, all of which are incorporated herein by reference in their entirety.

In addition, nano-composite materials of the present invention can also be used as building blocks to construct hierarchical microporous structures using processes that are known in the art. For example, pure crystalline molecular sieves have been produced as free-standing films, and films, spheres and fibers have been constructed from nanometer-sized crystals.

Removing Organic Compound from Nano-composite Material

The compositions of the present invention generally are produced by removing the organic compound from the nano-composite material. Accordingly, methods of the present invention comprise exposing or irradiating the nano-composite material to light or electromagnetic radiation (i.e., photolysis) having a wavelength shorter than visible light under conditions sufficient to selectively remove the organic compound from the nano-composite material. Preferably, a majority of the organic compound is removed from the nano-composite material while substantially all of the inorganic material remains in the microporous material. The amount of organic compound that can be selectively removed from the nano-composite material depends on a variety of factors, such as the time of exposure, the wavelength of electromagnetic radiation, the emission power of the light source, the distance between the light source and the nano-composite material, and other reaction conditions. Typically, however, methods of the present invention remove at least about 90% by weight of the organic compound that is present in the nano-composite material. Preferably, at least about 95% by weight of the organic compound is selectively removed from the nano-composite material by methods of the present invention. More preferably, methods of the present invention selectively remove at least about 99% of the organic compound that is present in the nano-composite material.

Preferably, the wavelength of electromagnetic radiation that is used in photolysis is about 280 nm or less. More preferably, methods of the present invention involve exposing the nano-composite material to deep ultraviolet light whose wavelength ranges from about 280 nm to about 100 nm. Especially preferred electromagnetic radiation has a wavelength in the range of from about 260 nm to about 180 nm.

It is believed that methods of the present invention remove the organic compound that is present within the nano-composite material by direct and/or indirect degradation. Without being bound by any theory, in some instances, it is believed that degradation of the organic compound is caused by absorption of electromagnetic radiation of high energy by the organic compound. Thus, in general any electromagnetic radiation of a sufficiently high energy that can be absorbed by the organic compound and causes degradation or fragmentation of the organic compound can be used in methods of the present invention.

The electromagnetic radiation can also, or alternatively, be absorbed by some other molecule, for example, an oxidizing agent or a reducing agent, which then generates a reactive species that causes degradation of the organic compound. Such a process is called a photooxidative process when the degradation is carried out via electromagnetic radiation in the presence of an oxidizing agent and is called a photoreductive process when the degradation is carried out via electromagnetic radiation in the presence of a reducing agent. The reactive species can be generated as a result of fragmentation of the molecule and/or excitation of the molecule to a highly reactive energy state. For example, exposing oxygen to UV light generates ozone and/or singlet oxygen, both of which can participate in degradation of the organic compound.

Suitable oxidizing agents for a photooxidative process include compounds that absorb electromagnetic radiation and generate a reactive oxidative species, such as a radical or an ion. Exemplary oxidizing agents that are useful in the photooxidative process of the present invention include, but are not limited to, oxygen, peroxides (e.g., hydrogen peroxide, peracids, such as mCPBA, and the like), perhalogenates (e.g., perchlorates, periodates, and the like), and the like.

In one aspect of the present invention, removal of the organic compound from the nano-composite material is achieved by a photooxidative process. The photooxidative process will now be described with regard to using oxygen as the oxidizing agent. However, it should be appreciated that methods of the present invention are not limited to photooxidative processes, or limited to using oxygen as the oxidizing agent.

Typically, in a photooxidative process the nano-composite material is exposed to UV light using a mercury discharge lamp in the presence of oxygen, e.g., air, pure oxygen gas or pure oxygen gas that is diluted with an inert gas, such as helium or argon. The lamp generates deep ultraviolet (DUV) light having a wavelength ranging from 184 nm to 257 nm. When oxygen is irradiated with light having a wavelength below 245.4 nm, e.g., at $\lambda$=184 nm, it produces singlet oxygen and/or dissociates to produce ozone and atomic oxygen (collectively referred herein as "activated oxygen"). Without being bound by any theory, it is believed that the 253.7 nm wavelength DUV light emitted by the same lamp also excites and/or dissociates the organic compound, thereby producing activated organic species, such as ions, free radicals, and/or excited organic molecules. The activated oxygen reacts with the organic compound or the activated organic species to form simpler volatile (or removable) products, such as $CO_2$, $H_2O$, and $N_2$ (if nitrogen atoms are present in the organic compound), which then escape the solid crystalline lattice of the inorganic material. It is believed that a synergistic effect is observed in removing the organic compound by simultaneously generating both the activated organic species and the activated oxygen in methods of the present invention.

Unlike calcination, which typically requires temperature of about 500° C. or higher, methods of the present invention do not require a high photolysis temperature to remove the organic compound from the nano-composite material. This is possible because methods of the present invention allow photo-degradation of the organic compounds. Accordingly, methods of the present invention can be used to produce microporous inorganic materials that are unavailable via calcination, e.g., microporous inorganic materials whose frameworks, i.e., microscopic structures, that are unstable at elevated temperatures. In addition, since methods of the present invention do not require a high temperature for removing the organic compound from the nano-composite material, spatial control and patterning of function related to optical properties, topology, porosity, hydrophobicity, and structural morphology of the microporous thin film material on a wide range of substrates can be achieved.

Generally, photolysis of the nano-composite material is conducted at a temperature of about 200° C. or less, preferably at about 100° C. or less. A typical photolysis temperature range is from about 20° C. to about 100° C. More often the photolysis temperature range is from about 20° C. to about 50° C., with ambient temperature, i.e., about 20° C. to 30° C., being particularly preferred. It should be appreciated that the photolysis temperature refers to a temperature in which the photolysis is conducted, which does not necessarily reflect the actual surface temperature of the nano-composite material during photolysis. In fact, because a high energy electromagnetic radiation, i.e., wavelength shorter than visible light, is used in methods of the present invention, the temperature of nano-composite material during photolysis is likely be slightly, if not significantly, higher than the ambient or surrounding temperature.

As expected, the amount of organic compound removed via photolysis depends on a variety of factors, including the distance between the lamp and the nano-composite material, the nature and reactivity of the organic compound to be removed, the presence of organic compound removal agents, such as an oxidizing agent, as well as other reaction conditions. Generally, the photolysis time ranges from about 0.1 hour to about 100 hours. Typically, however, the photolysis time ranges from about 10 to about 50 hours, with 20 to about 40 hours being particularly preferred.

As discussed above, the distance between the lamp, i.e., the electromagnetic radiation source, and the nano-composite material also can influence the amount of organic compound removal and the photolysis time required. Typically, the nano-composite material is placed about 20 cm or less from the lamp during photolysis. Often, however, the nano-composite material is placed about 10 cm or less from the lamp during photolysis, with the distance between the nano-composite material and the lamp of about 2 cm or less being a particularly preferred distance.

Photolysis of the nano-composite material can also be conducted using a mask which allows removal of the organic compound from selective region(s) of the nano-composite material. Alternatively, photolysis can be achieved only in the selected regions of the nano-composite material by using a directed light source, such as laser. However, using a mask to generate a patterned microporous material is typically employed. The use of mask in photolysis provides ability to pattern thin films or bulk microporous materials. Some of the patterned microporous materials are important in a number of applications, including sensors micro-arrays, photonic and electronic applications, catalyst screening, nanochemistry, as well as other applications. See Davis, Nature, 2002, 417, 813–821; Wirnsberger et al., Chem. Mater., 2001, 13, 3140–3150; Yang et al., Science, 2000, 287, 465–467; Corma, Chem. Rev., 1997, 97, 2373–2419; Stein et al., Adv. Mater., 2000, 12, 1403–1419; and Schüth et al., Adv. Mater., 2002, 14, 629–638, all of which are incorporated herein by reference in their entirety.

Figure 5:
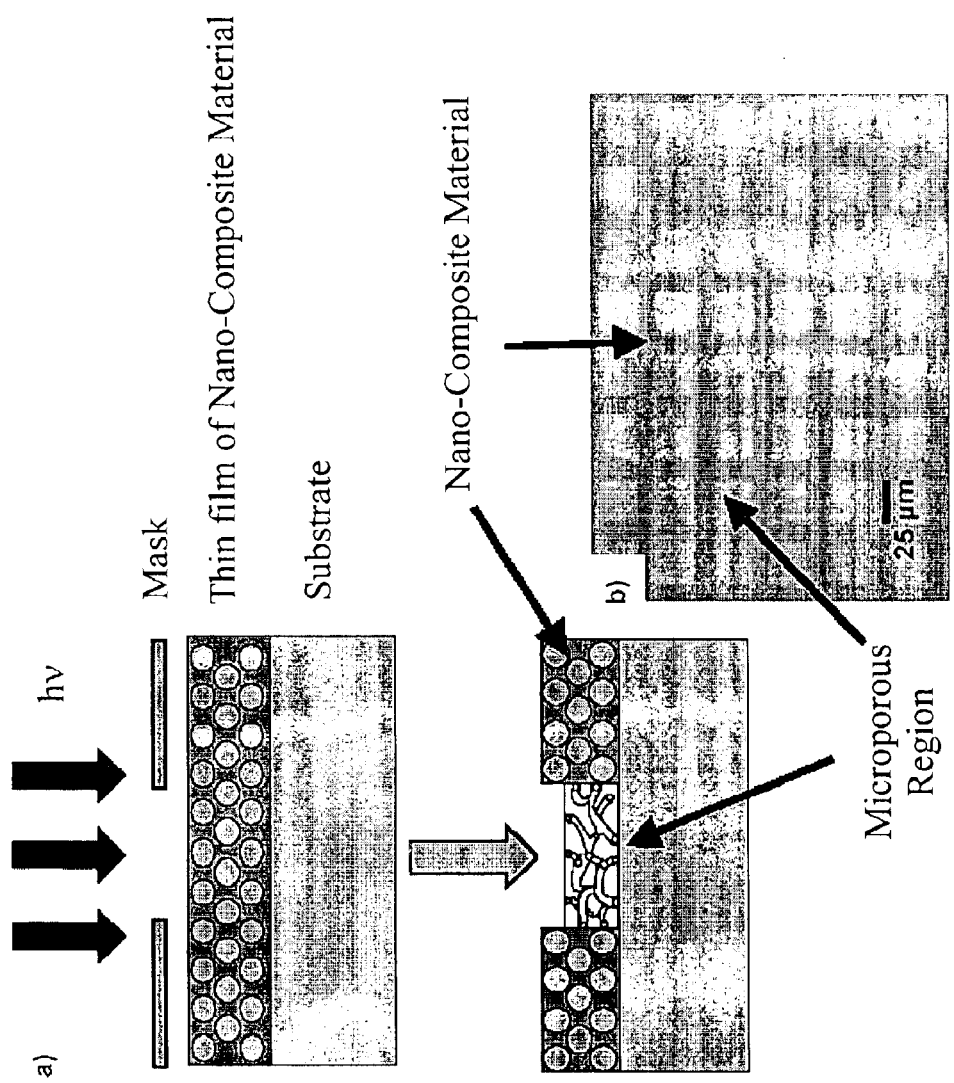
FIG. 5 is a schematic illustration showing a pattern formation on nano-composite material using a mask.

Using a mask in photolysis to generate a patterned microporous material is similar to other well known photolithography processes. For example, as illustrated in FIG. 5, a physical mask, such as a chromium pattern deposited onto a quartz window is used to block light from specific regions of the nano-composite material surface. The mask allows selective removal of the organic compound from only the parts of the nano-composite material that is exposed to light. Typically, the pattern resolution is limited, among others, by the mask and/or the wavelength of light used. In some embodiments, subsequent chemical processing of the nano-composite materials affords enhanced patterns.

Utility

Microporous materials are useful in a variety of application, such as catalysis (including as cracking catalysts in a fluid catalytic cracking process), separation, ion exchange, electronics, sensors, diagnostics, stationary phases (e.g., in high performance liquid chromatography, i.e., HPLC), as well as other applications known to one skilled in the art. Some applications of microporous materials (e.g., sensors, separation membranes, low dielectric-constant materials, lasing media) generally require planar forms, which can be readily produced on support (i.e., substrate) surfaces.

One of the major disadvantages of the direct synthesis of some conventional microporous material on substrate surfaces is the need for calcination to remove the organic compound. Methods for producing free standing and a substrate supported microporous materials, e.g., zeolites, are known. See, for example, U.S. Pat. No. 4,699,892, issued to Suzuki, and U.S. Pat. No. 5,019,263, issued to Haag et al., which are incorporated herein by reference in their entirety.

Since a typical calcination process requires a high temperature, it can not be used in materials that are temperature-sensitive. This is also true when a thin film of nano-composite material is coated on to a temperature substrate, such as a semiconductor, prior to calcination to produce a substrate supported microporous material. Since the present invention does not require high temperature conditions to remove the organic compound from the nano-composite material, methods of the present invention are particularly useful in producing a wide variety of microporous materials that are unavailable using calcination processes.

The microporous materials of the present invention can be used as cracking catalysts in catalytic cracking processes alone or in combination with other cracking catalyst materials, such as zeolites (e.g., USY zeolites), and activated matrix. The use of microporous aluminophosphates in cracking catalysts is known. For example, U.S. Pat. No. 4,919,787, which is incorporated herein by reference in its entirety, describes the use of porous, rare earth oxide, alumina, and aluminum phosphate precipitates for catalytic cracking. This material is used as part of a cracking catalyst, where it acts as a metal passivating agent. The use of a magnesia-alumina-aluminum phosphate supported catalyst for cracking gasoline feedstock is described in U.S. Pat. No. 4,179,358, which is incorporated herein by reference in its entirety. Additionally, a process for catalytic cracking high-metals-content-charge stocks using an alumina-aluminum phosphate-silica-zeolite catalyst is described in U.S. Pat. No. 4,158,621, which is incorporated herein by reference in its entirety. Other conventional cracking catalyst materials, such as binding agents, clays, alumina, silica-alumina, and the like, can also be included as part of the cracking catalyst.

As is well known in the art, catalytic cracking processes convert feedstock hydrocarbon compounds to product hydrocarbon compounds of lower molecular weight than the feedstock hydrocarbon compounds. In particular, the microporous materials of the present invention can be used in catalytic processes operating at temperatures typically known to one skilled in the art as well as under reduced, atmospheric or superatmospheric pressure. The catalytic process can be either fixed bed, moving bed or fluidized bed and the hydrocarbon flow can be either concurrent or countercurrent to the catalyst flow. The microporous materials of the present invention are useful in the Fluid Catalytic Cracking ("FCC") as well as Thermofor Catalytic Cracking (TCC) processes.

The TCC process is a moving bed process and the catalyst is often in the shape of pellets or beads, typically having an average particle size of about one-sixty-fourth to one-fourth inch. In TCC process, active hot catalyst beads progress downwardly concurrent with a hydrocarbon charge stock through a cracking reaction zone. The hydrocarbon products are separated from the coked catalyst and recovered, and the catalyst is recovered at the lower end of the zone and regenerated.

The microporous materials of the present invention are also useful in fluid catalytic cracking (FCC) processes, in which the cracking catalyst is typically a fine powder with a particle size of about 10 to 200 microns. This powder is generally suspended in the feed and propelled upward in a reaction zone. A relatively heavy hydrocarbon feedstock, e.g., a gas oil, is admixed with the cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. Entrained hydrocarbons can be removed from the spent catalyst prior to conveying the latter to a catalyst regenerator unit, for example, by passing an inert stripping gas, e.g., steam, through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

The hydrocarbon feedstock to be cracked can include, in whole or in part, a gas oil, e.g., light, medium, or heavy gas oil. The feedstock can also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like.

Microporous materials can also be used as membranes (e.g., thin films) in fluid mixture separations, molecular sieves, and membrane reactors. They can also serve as sensors and hosts for guest species, which in turn can impart the material with optical, electrical or magnetic properties depending on the guest species.

Microporous materials are useful in membrane-based applications, in part, because of the selective adsorption (and absorption) properties imparted by their substantially uniform pore structure. Microporous materials offer several advantages over dense inorganic or polymeric thin-film materials which include, for example, high selectivity due to uniform pore size and facile diffusion.

Microporous materials of the present invention can also be used in pH sensors, as low dielectric barriers in electronic devices, and can be incorporated as functional elements inphotonic devices. See, for example, Zhao et al., *Adv. Mater.*, 1998, 10, 1380–1385, Yang et al., *Adv. Mater.*, 2001, 13, 1089–1102, Liu et al., U.S. Pat. No. 6,329,017, issued to Liu et al., Wirnsberger et al., *Chem. Commun.*, 2001, 119–120, Fan et al., *Nature*, 2000, 405, 56–60, Lu et al., *J. Am. Chem. Soc.*, 2000, 122, 5258–5261, Baskaran et al., *Adv. Mater.*, 2000, 12, 291–294, and Doshi et al., *Science*, 2000, 290, 107–111, all of which are incorporated herein by reference in their entirety.

By incorporating other materials, microporous materials can be used in other applications. In this manner, microporous materials can be used, for example, as contrast agents in diagnostic magnetic resonance imaging (MRI) by incorporating high-spin metals into the microporous material structure. Often, diagnostic MRI relies on administering contrast agents to patients to improve the diagnostic value of MRI. The contrast agents typically contain high-spin metals that bind water molecules and thereby yield proton spin relaxation times ($T_1$) that are orders of magnitude faster than those obtained with free water. For example, Gadolinium ions, $Gd^{+3}$, perform particularly well as contrast agents, but cannot be administered directly because of its inherent toxicity. However, $Gd^{+3}$ contained in microporous materials, such as zeolites, has been shown to be useful as contrast agent for the gastrointestinal tract without the high toxicity associated with $Gd^{+3}$. See, for example, U.S. Pat. No. 5,122,363, issued to Balkus et al., and Balkus et al., *Mater. Res. Soc. Symp. Ser. Proc.*, 1991, 223, 225–230, which are incorporated herein by reference in their entirety. Zeolites are relatively non-toxic when introduced in the gastrointestinal tract. Thus, it is believed that immobilization of the $Gd^{+3}$ within the zeolite framework mitigates toxicity of $Gd^{+3}$, while still allowing hydration by adsorbed water to allow for NMR $T_1$ relaxation effects.

Yet another use of microporous materials is as host materials in laser applications, e.g., zeolite-dye microlaser. In particular, incorporation of organic dyes as guest species in microporous materials, e.g., crystalline $AlPO_4$-5, afford lasing molecular sieves, with size, shape and arrangement of the crystals of the microporous materials affecting the performance of the system. See, for example, Vietze et al., *Phys. Rev. Lett.*, 1998, 81, 4628–4631, Ihlein et al. *Adv. Mater.*, 1998, 10, 1117–1119, Weib et al., *Stud. Surf. Sci. Catal.* 135, [CD-ROM] Paper 21-O-04 (Elsevier, 2001).

Additional objects, advantages, and novel features of this invention will become apparent to those skilled in the art upon examination of the following examples thereof, which are not intended to be limiting.

EXAMPLES

General

Commercially available, freshly-cleaned UV lamp-grid was used in photolysis with samples maintained about 2 to 3 mm below the lamp surface. While irradiation of the sample with UV light was performed at room temperature, in some instances local temperature of the support platform during photolysis increased to about 40–50° C. In a comparative example, the as-prepared materials were calcined at about 550° C. for about 10 h in air.

Example 1

This example illustrates a method for producing silicalite and aluminophosphate nano-composite materials using organic molecules as templates.

Using the procedures described in Persson et al., *Zeolites*, 1994, 14, 557–567, and U.S. Pat. No. 4,310,440, issued to Wilson et al., silicalite and aluminophosphate nano-composite materials, respectively, were prepared as follows.

Tetrapropylammonium silicalite zeolite (i.e., TPA-silicalite-1 or MFI zeolite) was synthesized by reacting the initial synthetic mixture with the composition 25 $SiO_2$:480 $H_2O$:9 TPAOH:100 ethanol at 80° C. for 72 h. The synthetic mixture was prepared by vigorously stirring 119.10 g of 10% TPAOH solution (Fisher), 30.32 g of 40% TPAOH solution (Alfa), and 68.4 g of tetraethylorthosilicate (TEOS, Alfa) at room temperature for 2–3 h untill homogeneous and optically clear.

$AlPO_4$-5 was similarly prepared by reacting a synthetic mixture of composition 1.5 tripropylamine:$Al_2O_3$:$P_2O_5$:40 $H_2O$ at 150° C. for 48 h under an autogenous pressure in a Teflon-lined autoclave. The initial mixture was prepared by adding 4.75 g tripropylamine to a pre-hydrolyzed aqueous solution of 12 g aluminum isopropoxide slurry. After 10 min of vigorous stirring, $H_3PO_4$ was dropped slowly to the mixture. Tripropyl amine ($Pr_3N$) served as a structure-directing agent (i.e., template) for $AlPO_4$-5 whereas tetrapropyl ammonium hydroxide was used as the template for the MFI zeolite.

Example 2

This example illustrates a method for removing organic molecules from the nano-composite materials using light.

The nano-composite materials from Example 1 above were irradiated with UV light ($\lambda$=184–257 nm) produced by a low or medium pressure Hg discharge lamp in a quartz envelope. The lamp was maintained in a closed chamber under ambient laboratory conditions. In some instances, oxygen was introduced to accelerate removal of the organic compound from the nano-composite material. Samples were spread loosely on a clean glass slide or a silicon wafer inside the UV chamber.

The exposure time required for substantially complete removal of the organic compound depended on a variety of factors, such as the lamp power, cleanliness of the lamp, presence of added oxygen, and the distance of the sample from the lamp. Typically, however, the exposure time ranged from about 30 to about 60 h. The organic compound removal progress was monitored, for example, using Fourier Transform Infrared (i.e., FT-IR) measurements. In most instances, the spectral peak due to the organic compound vanished after about 20 to about 30 h of UV exposure. However, carbon dioxide, one of the presumed product of the photochemical process, remained, presumably inside the pores, for a significantly longer period. Generally about 60 h exposure time was required to remove substantially all residual $CO_2$.

Example 3

This example illustrates a method for preparing a nano-composite silicate material comprising germanium.

Using the procedure described by Corma et al., *Chem. Commun.*, 2001, 20, 2148–2149, ITQ-7 exhibiting a Si/Ge-ratio of 5 was synthesized with a material composition of 0.833 $SiO_2$:0.167 $GeO_2$:0.50 $C_{14}H_{26}NOH$:0.5 HF:3 $H_2O$ where $C_{14}H_{26}NOH$ (i.e. 1,3,3-trimethyl-6-azoniumtricyclo [$3.2.1.4^{6,6}$] dodecane hydroxide) is used as the SDA.

Example 4

This example illustrates a method for preparing a patterned microporous material using a mask during photolysis.

ITQ-7 material is subjected to the photolysis procedure of Example 2 using a spatially confining light source, such as a focused UV light source, e.g., a UV laser. Alternatively, a mask can be placed over the nano-composite material thereby allowing only desired regions of the nano-composite material to be exposed to UV light. In this manner, a patterned microporous inorganic material is obtained.

Results of the Examples

Without being bound by any theory, it is believed that photolysis of the nano-composite material converts the organic compound (i.e., structure directing agent or SDA) to carbon dioxide, water, and nitrogen, and leaving a well-defined crystalline microporous materials (e.g., zeolites) having a high surface area. The methods of the present invention are applicable to wide variety of microporous materials and typically are carried out under ambient conditions.

To demonstrate methods of the present invention, direct comparison of microporous materials of the present invention was made with microporous material prepared by a calcination process and previously well-characterized microporous materials, including a pure silica synthetic zeolite and an aluminosilicate molecular sieve.

As expected, calcination of nano-composite materials resulted in a substantially unchanged inorganic framework crystallinity, loss of the SDA, and highly accessible porosity. Similar changes were observed under methods of the present invention.

Figure 2:
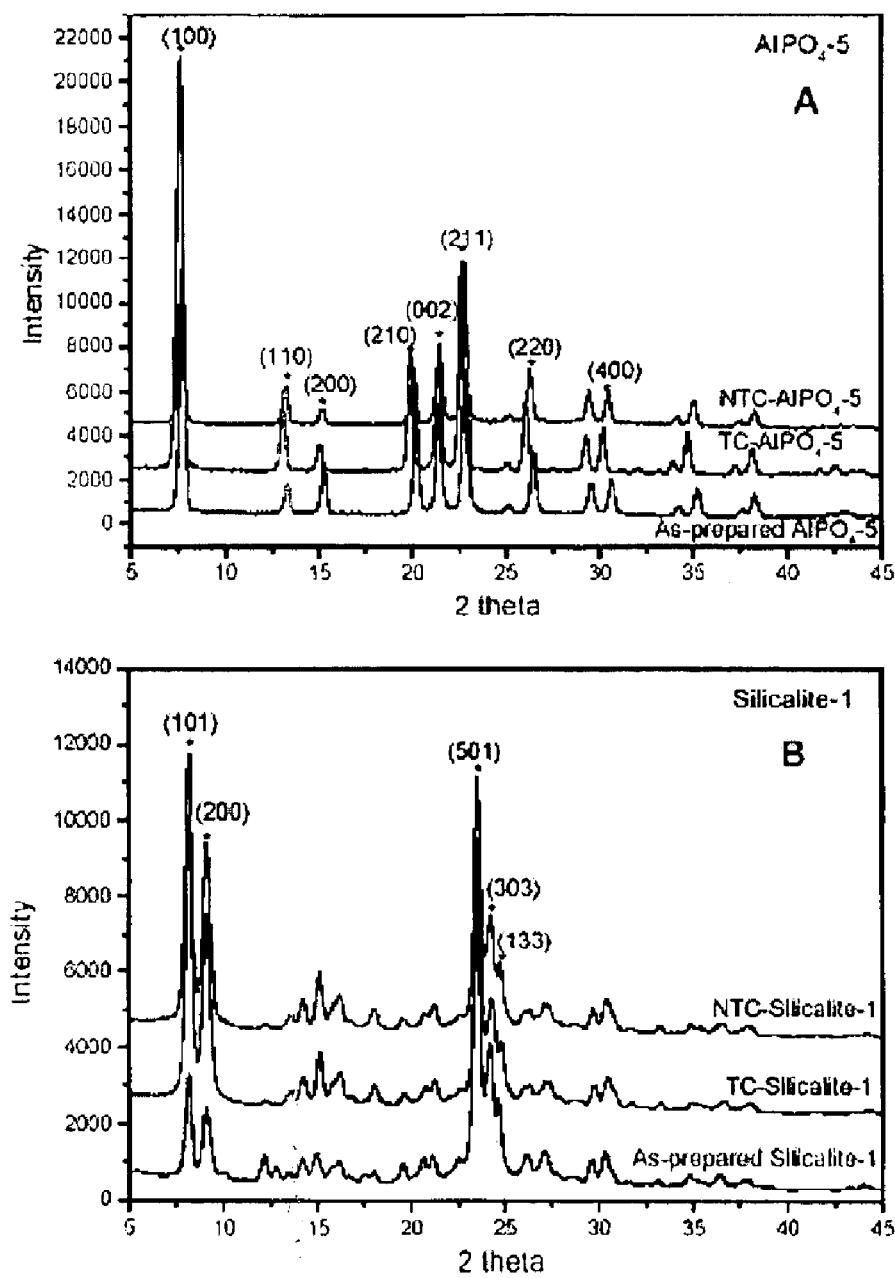
FIG. 2 is X-ray diffraction patterns of as-prepared, calcined (tc), and photolyzed (NTC) (a) AlPO$_4$-5 and (b) TPA-Silicalite-1 of Examples 1 and 2.

For both TPA-silicalite-1 and $AlPO_4$-5, the SDA was substantially completely removed during the UV exposure, as evidenced by Fourier transform infrared spectroscopy (FT-IR) (See FIG. 2). FTIR spectra of as-prepared and calcined samples, also shown in FIG. 1, provide a direct comparison. The presence of SDA molecules in the as-synthesized zeolites can be directly discerned by a number of peaks which can be assigned to modes due to methylene (—$CH_2$—) and methyl (—$CH_3$) C—H vibrations in the 2700–3100 $cm^{-1}$ region and to methyl bending modes in the 1460–1475 $cm^{-1}$ region. Note the SDA peaks with maxima at 2883, 2943, and 2981 $cm^{-1}$ for the TPAsilicalite-1 and a series of overlapping peaks with maxima at 2681, 2956, and 3005 $cm^{-1}$ for the $AlPO_4$-5 and a methyl bending mode in the 1460–1470 $cm^{-1}$ region (doublet at with maxima at 1460 and 1474 $cm^{-1}$ for the TPA-silicalite-1 and a broad envelope with a maxima at 1478 $cm^{-1}$ for $AlPO_4$-5.

In the IR spectra for the calcined samples and UV exposed (i.e., irradiated) samples, these peaks are absent, confirming the essentially complete removal of the SDA, i.e., residual organic compounds well below 1% of the original content. See FIG. 1. There is a weak, but distinct, feature between 3700 and 3740 $cm^{-1}$ in the photolysis TPA-silicalite-1 spectrum within the broad envelope due to hydroxyl stretching modes. This absorption is also resolved by Fourier deconvolution in the photolysis $AlPO_4$-5 sample as well, but that spectrum does not show a well-resolved peak on visual inspection. These absorptions are believed to be due to the formation of non-acidic isolated silanol, Si—O—H, groups presumably within the pore interiors, which is also consistent with the removal of SDA.

Additional support for the essentially complete removal of SDA is provided by the carbon analysis. The initial C contents for $AlPO_4$-5 and TPA-silicalite-1 were 4.9% and 10.3%, respectively, for as-synthesized samples. These decreased to 0.036% ($AlPO_4$-5) and 0.046% (TPA-silicalite-1) upon photolysis, slightly lower than the values of 0.039% and 0.050%, respectively, for calcination products. The retention of crystalline order of the inorganic oxide frameworks upon photolysis is quantitatively comparable to that of calcined samples, as confirmed by the powder XRD patterns in FIG. 2. The patterns for the as-synthesized TPA-silicalite-1 and $AlPO_4$-5 show a series of well-resolved intense peaks which can be readily assigned to the (hkl) reflections for the Pnma orthorhombic and P6 cc hexagonal symmetries, respectively, in good agreement with previous reports. See Ravishankar et al, *J. Phys. Chem. B*, 1998, 102, 2633–2639, and Qui et al., *Zeolites*, 1989, 9, 440–444.

After the calcination and photolysis processes, these peaks remain, confirming that the material retains crystallinity and phase of the inorganic framework. Accessible porosity has been obtained using nitrogen adsorption-desorption isotherm measurements. The experiments used a Micromeritics ASAP 2010 porosimeter at −196° C. (77K). Samples were outgassed at 225° C. for 12 h under ultra-high-purity He. Liquid nitrogen was used as a coolant over a P/Po range of 0.00025 to 1.0. Typically, 30 s of equilibration time was used and adsorption/desorption isotherm cycles measured. The data indicate type I isotherms, typical of microporous materials, with little or no hysterisis. BET surface-areas for photolysis samples were determined to be 501 $m^2g^{-1}$ for TPAsilicalite-1 and 310 $m^2g^{-1}$ for $AlPO_4$-5. By comparison, the surface areas of calcined samples were determined to be 501 $m^2g^{-1}$ and 240 $m^2g^{-1}$, respectively. Thus, the surface areas of UV irradiated organic-free samples are as high or higher than those of SDA-free materials produced by conventional calcination.

The thermal behavior of photolysis samples was also comparable to that of calcined samples. For both $AlPO_4$-5 and TPA-silicalite-1, UV exposed samples show less than 2% mass loss in thermogravimetry (data not shown). These losses occur mostly below 170° C., presumably indicating the loss of physically adsorbed water. This is in good agreement with the behavior of calcined samples. Taken together, the data show that it is possible to use photolysis under ambient conditions to remove the SDA, retain the structural integrity and crystallinity of the inorganic oxide framework, and generate functional porosity. Moreover, as the data show, microporous materials produced by photolysis are comparable to or better than microporous materials produced by calcination.

Without being bound by any theory, it is believed that the mechanism by which photolysis (e.g., deep UV radiation) destroys the organic compounds may involve a complex set of photosensitized oxidation processes. For example, a portion of UV light, e.g., wavelength below 245.4 nm (optimally at $\lambda=184$ nm), may facilitates the dissociation of oxygen to produce an activated oxygen species. Simultaneously, a portion of UV light, e.g., wavelength at about 253.7 nm, emitted by the same lamp excites and/or dissociates the organic compound, thereby producing activated species, such as ions, free radicals, and excited molecules. Finally, the activated organic species are readily attacked by the activated oxygen to form simpler volatile (or removable) products, such as $CO_2$, $H_2O$, and $N_2$ which then escape the sample interior.

It is believed that the simultaneous presence of light that excites the organic molecule and the ensuing generation of activated oxygen are needed for effective removal of the organic compound by photolysis. An important practical feature of photolysis methods of the present invention is that SDA removal occurs at or near room temperature. Therefore, template-free microporous materials can be designed whose frameworks tend to become unstable or even collapse during a calcination process. To illustrate this feature, photolysis of a germanium-substituted ITQ-7 (Instituto de Tecnologia Quimica-Siete, structure code: ISV), an example of a new class of silicate-germanate molecular sieves. The material is of particular interest for its unique topology: it presents a very low-density inorganic framework with a three-dimensional system of large pores containing double four-membered rings. Removal of the SDA by calcination is known to destabilize its inorganic framework, presumably because of its high sensitivity to moisture absorption from air. See Blasco et al., *J. Phys. Chem. B*, 2002, 106, 2634.

Figure 3:
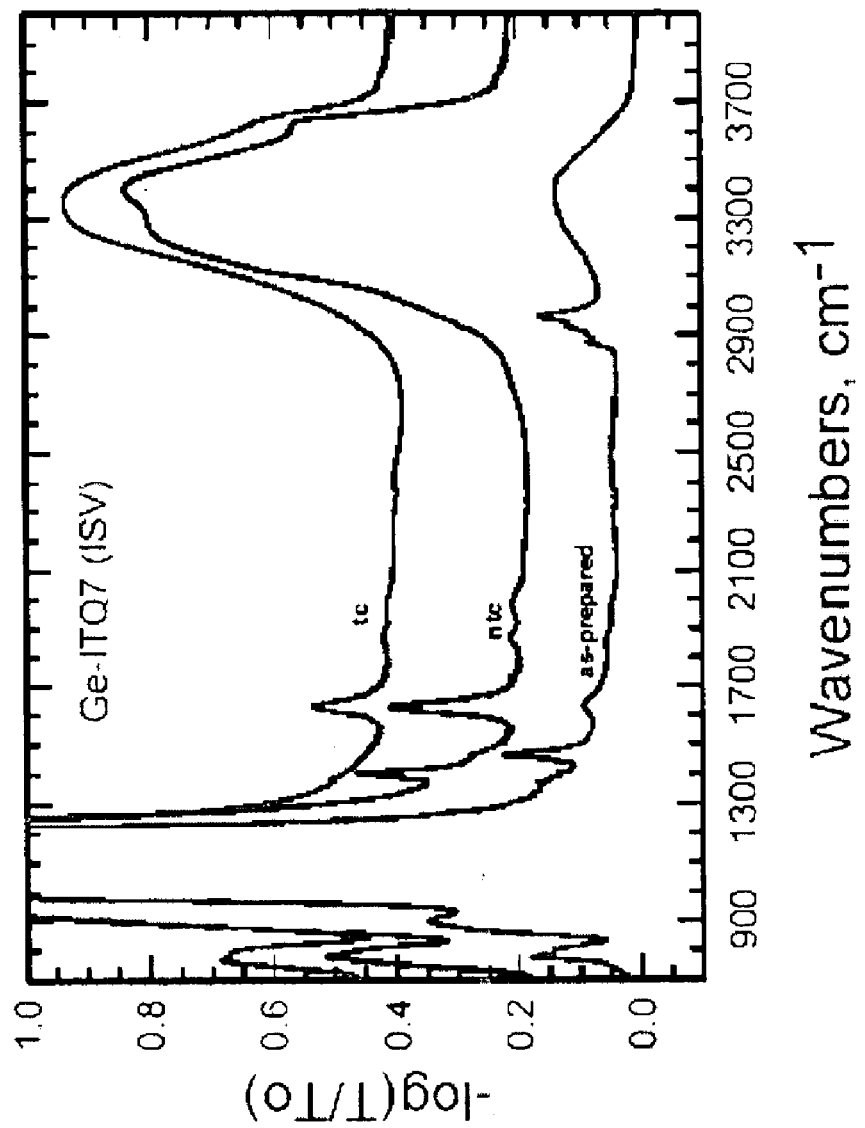
FIG. 3 is an infrared spectrum of pressed KBr pellets containing comparable quantities of as-prepared, calcined (tc), and photolyzed (NTC) Ge-substituted ITQ-7 of Example 4.
Figure 4:
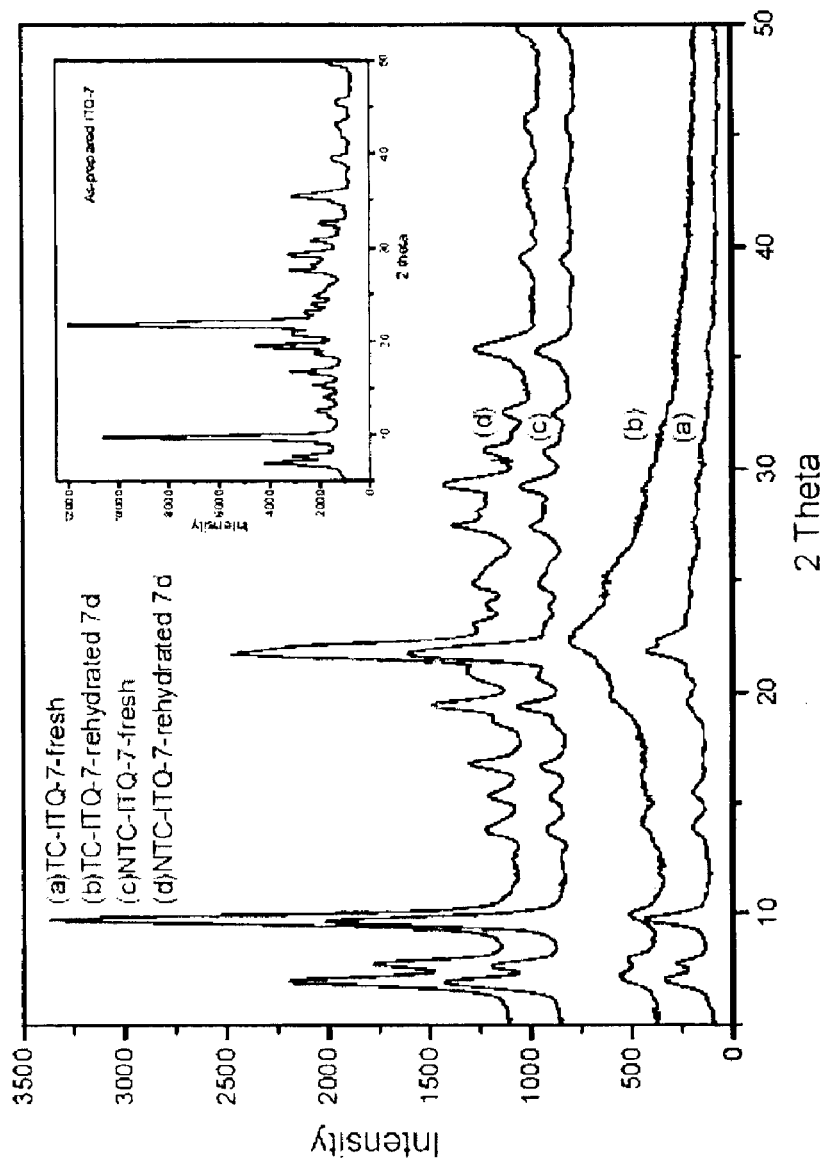
FIG. 4 is X-ray diffraction patterns of calcined and photolyzed Ge-substituted ITQ-7 of Example 4 upon (a) calcination and (b) rehydration for 7 days. Inset shows the pattern for as-prepared ITQ-7 before calcination.

In some instances, it has been observed that, when carefully controlled, a calcination process can be used to preserve the structure of ITQ-7 upon SDA removal. (data not shown). However, absorption of water under ambient conditions gradually degrades its inorganic framework, which loses crystallinity in several days. A comparison of the FTIR spectra for as-prepared, calcined, and photolysis samples shown in FIG. 3 confirms the effectiveness of methods of the present invention. The C—H stretching vibrational modes at 2700–3100 $cm^{-1}$ assigned to the SDA are clearly visible in the as-synthesized sample. Upon photolysis, these features became undetectable, confirming the loss of SDA. Calcined samples show similar behavior. BET isotherm data however reveal a difference: accessible porosity for calcined samples is much lower (319 $m^2/g$) than for photolysis sample (612 $m^2/g$). The photolysis 5Ge-ITQ-7 samples exhibit high crystallinity, with a diffraction pattern similar to that obtained for as-prepared samples, (see insert in FIG. 4) consistent with that reported earlier. Blasco et al., *J. Phys. Chem. B*, 2002, 106, 2634. The crystallinity of calcined ITQ-7 sample is lower (FIG. 4a), which is characterized by broad XRD peaks, and deteriorates further when its exposure to air or moisture is prolonged, eventually leading to a complete framework collapse (FIG. 4b).

In contrast, the photolysis sample retains significantly higher crystallinity upon SDA removal and does not collapse even upon extended exposure to air as well as direct rehydration (see FIGS. 4c and d).

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references and patents cited herein are incorporated herein by reference in their entirety.

What is claimed is:

1. A method for removing an organic compound from a nano-composite material which comprises the organic compound that is dispersed within a solid inorganic compound structure, said method comprising exposing the nano-composite material to electromagnetic radiation having a wavelength shorter than visible light under conditions sufficient to selectively remove the organic compound from the nano-composite material to produce a microporous inorganic material, wherein the nano-composite material is exposed to the electromagnetic radiation in the presence of oxygen gas.

2. The method of claim 1, wherein the organic compound in the nano-composite material is dispersed substantially uniformly within the solid inorganic compound structure.

3. The method of claim 1, wherein the wavelength of electromagnetic radiation is about 280 nm or less.

4. The method of claim 3, wherein the electromagnetic radiation is deep ultraviolet light.

5. The method of claim 1, wherein removal of the organic compound from the nano-composite material is conducted at a temperature of less than about 100° C.

6. The method of claim 1, wherein the organic compound is removed from one or more selected regions of the nano-composite material by exposing only the selected regions of the nano-composite material to the electromagnetic radiation.

7. The method of claim 6, wherein said method of removing the organic compound from the selected regions of the nano-composite material comprises placing a mask over the nano-composite material prior to exposing the selected regions of the nano-composite material to the electromagnetic radiation.

8. A method for producing a structured microporous inorganic material, said method comprising:

(a) producing a nano-composite material from a mixture comprising an organic compound and an inorganic compound such that the organic compound is dispersed within a first structured solid inorganic compound structure; and (b) removing the organic compound from the nano-composite material by exposing the nano-composite material to an electromagnetic radiation having a wavelength shorter than visible light under conditions sufficient to produce the structured microporous inorganic material, wherein exposure of the nano-composite material to the electromagnetic radiation is conducted in the presence of oxygen gas.

9. The method of claim 8, wherein the structure of the inorganic compound of said step (b) is substantially different from the first structured solid inorganic compound structure of said step (a).

10. The method of claim 8, wherein the structure of the inorganic compound of said step (b) is substantially similar to the first structured solid inorganic compound structure of said step (a).

11. The method of claim 8, wherein the wavelength of electromagnetic radiation is about 280 nm or less.

12. The method of claim 11, wherein the electromagnetic radiation is deep ultraviolet light.

13. The method of claim 8, wherein exposure of the nano-composite material to the electromagnetic radiation is conducted at a temperature of less than about 100° C.

14. The method of claim 8, wherein the structured inorganic material is a crystalline material.

15. The method of claim 8, wherein the structured inorganic material is an amorphous material.

16. A method for producing a microporous inorganic oxide material, said method comprising:

preparing a reaction mixture capable of forming an inorganic oxide, wherein the reaction mixture also comprises an organic compound;

producing a nano-composite material from the reaction mixture, wherein the nano-composite material comprises the organic compound that is dispersed within a solid inorganic oxide structure; and selectively removing the organic compound by exposing the nano-composite material to an electromagnetic radiation having a wavelength shorter than visible light to produce the microporous inorganic oxide material, wherein said exposing the nano-composite material to the electromagnetic radiation is conducted in the presence of oxygen gas.

17. The method of claim 16, wherein the microporous inorganic oxide is a hexagonally-packed microporous metal oxide.

18. The method of claim 16, wherein the inorganic oxide is selected from the group consisting of silicon oxide, a transition metal oxide, a lanthanide metal oxide, and a combination thereof.

19. The method of claim 16, wherein the microporous inorganic oxide material is a microporous silica material or a microporous aluminophosphate material.

20. The method of claim 16, wherein the organic compound is a small organic molecule, a synthetic polymer, a biological material, or a combination of two or more thereof.

21. The method of claim 16, wherein the reaction mixture is an aqueous solution.

22. The method of claim 16 further comprising drying the nano-composite material prior to exposing the nano-composite material to the electromagnetic radiation.

23. The method of claim 22, wherein the nano-composite material is dried at a temperature of less than about 200° C.

24. The method of claim 23, wherein the nano-composite material is dried at a temperature in the range from about 25° C. to about 200° C.

25. The method of claim 16 further comprising calcining the microporous inorganic oxide material.

26. The method of claim 16, wherein the wavelength of electromagnetic radiation is about 280 nm or less.

27. The method of claim 26, wherein the electromagnetic radiation is deep ultraviolet light.

28. The method of claim 26, wherein exposure of the nano-composite material to the electromagnetic radiation is conducted at a temperature of less than about 100° C.

29. The method of claim 16, wherein the nano-composite material is exposed to the electromagnetic radiation for about 0.1 to about 100 hours.

30. A method for producing a microporous inorganic material, said method comprising:

producing a nano-composite material which comprises an organic compound that is dispersed within a solid inorganic compound structure; and selectively removing the organic compound from the nano-composite material to produce the microporous inorganic material by irradiating the nano-composite material with light having a wavelength shorter than visible light under conditions sufficient to selectively remove the organic compound from the nano-composite material, wherein said irradiating the nano-composite material is conducted in the presence of oxygen gas.

31. The method of claim 30, wherein said irradiating the nano-composite material is conducted at a temperature of less than about 100° C.

32. A method for producing a crystalline inorganic material comprising:

producing a crystalline nano-composite material which comprises an organic compound that is dispersed within a solid inorganic crystalline structure; and selectively removing the organic compound by exposing the nano-composite material to light having a wavelength smaller than the wavelength of visible light under conditions sufficient to produce the crystalline inorganic material, wherein said exposing the nano-composite material is conducted in the presence of oxygen gas.

33. The method of claim 32, wherein the crystalline inorganic material is a microporous crystalline material.

34. The method of claim 33, wherein the wavelength of light ranges from about 260 nm to about 180 nm.

35. A method for producing a microporous inorganic material comprising:

producing a nano-composite material, wherein the nano-composite material comprises a majority of individual organic molecule that is separated from other organic molecules within a solid inorganic material framework; and selectively removing the organic molecules from the nano-composite material by exposing the nano-composite material to deep ultraviolet light under conditions sufficient to produce the microporous inorganic material, wherein the nano-composite material is exposed to deep ultraviolet light in the presence of oxygen.

* * * * *